United States Patent [19]

Iwabuchi

[11] Patent Number: 5,390,895
[45] Date of Patent: Feb. 21, 1995

[54] SLOW VENT VALVE

[75] Inventor: Toshiaki Iwabuchi, Yabutsukahonmachi, Japan

[73] Assignee: Benkan Corporation, Tokyo, Japan

[21] Appl. No.: 186,537

[22] Filed: Jan. 26, 1994

[30] Foreign Application Priority Data

Apr. 2, 1993 [JP] Japan .................. 5-100428

[51] Int. Cl.6 .......................................... F16K 31/122
[52] U.S. Cl. ..................................... 251/60; 251/63.4; 251/285; 251/331
[58] Field of Search ................. 251/60, 63.4, 285, 331

[56] References Cited

U.S. PATENT DOCUMENTS

| | | | |
|---|---|---|---|
| 4,169,405 | 10/1979 | Tsunemoto et al. | 251/60 X |
| 4,801,051 | 1/1989 | Lewis et al. | 251/60 X |
| 4,903,939 | 2/1990 | Ariizumi et al. | 251/63.4 |

Primary Examiner—Martin P. Schwadron
Assistant Examiner—Kevin L. Lee
Attorney, Agent, or Firm—Eric P. Schellin

[57] ABSTRACT

A slow vent valve for semiconductor wafer manufacturing equipment is disclosed, which generates a gentle flow of nitrogen gas to the vacuum chamber enough to maintain an undisturbed ambient environment for the wafer being processed in the chamber, protecting the product from disturbed by particulate raised or objectionable ambient stirring caused by the entering gas. The valve includes an adjustable cam mechanism including a valve open timing adjuster and a slow-venting adjuster. The valve open timing adjuster changes the initial diaphragm pressing force on the valve seat, to thereby determine the open speed and the open timing of the valve to take a lift off the valve seat. The slow venting adjuster is provided to adjust the resistance of a spring that exerts downward pressure on a second piston integrated with the valve rod, to thereby slow the slightly upward movement of the rod to operate the diaphragm to permit a slowed flow of nitrogen gas to the vacuum chamber.

1 Claim, 2 Drawing Sheets

SLOW VENT VALVE

BACKGROUND OF THE INVENTION

1) Field of the Invention

This invention relates in general to a slow vent valve capable of supplying controlled flow of gas in two stages and, in particular, to such a valve which is suitable for purging or recovering atmospheric pressure in an evacuated vacuum chamber in semiconductor manufacturing equipment.

2) Description of the Prior Art

A variety of valve systems have been developed for a vent of vacuum chambers in semiconductor wafer manufacturing machinery in which the flow of nitrogen gas has to be controlled to return the evacuated vacuum chamber to atmospheric pressure after chemical vapor deposition or sputtering has been performed on a silicon wafer in the chamber.

During the time when it is vented, the vacuum chamber should be maintained in sufficient stillness in order to protect the wafer from being polluted by internally trapped particulate or from being flicked off, the inflow of nitrogen gas into the chamber has to be gentle enough not to raise particulate deposited on the chamber bed or cause an excessive, movement of air.

However, the inflow of gas to the vacuum chamber has to be strong enough to insure effective chamber purging. In addition, if the gas flow is too much throttled, restoring the vacuum chamber to normal pressure will take a much longer time, delaying the entire wafer production time.

The venting valve system illustrated in FIG. 2 may be typically used with a vacuum chamber 1 for wafer manufacturing equipment, which comprises an inlet piping 2, a needle valve 3 and a first air valve 4 provided in series to supply nitrogen gas to recover atmospheric pressure in the evacuated chamber. Also, a second air valve 5 is provided in parallel with the needle valve 3 and the first air valve 4 to supply gas to purge the chamber 1. In addition, connected to the chamber 1 at the downstream side is an exhaust piping 7 which leads to a vacuum pump 8 through a check valve 6, provided to evacuate the vacuum chamber 1.

With this arrangement, when the evacuated vacuum chamber 1 is returned to atmospheric pressure, the first air valve 4 is actuated to open and introduce nitrogen gas into the chamber for a pressure of 200-300 torrs. The needle valve 3 is also operated to control a flow rate so that the entering gas will not blow dust or flip the wafer off its position in the chamber.

In the next step, the second air valve 5 is actuated to fully open; therefore, all the valves 3, 4 and 5 are actuated to open and introduce full flow of nitrogen gas into the chamber.

When any remaining gas within the chamber 1 and connected upper system are to be purged, all the valves are opened to flow into the chamber 1 through the inlet piping 2, with the vacuum pump 8 being put into purge operation of remaining gas to the exhaust pipe 7.

However, those conventional valve systems as the one illustrated in FIG. 2 have been found to pose various problems. For one, they are complicated requiring as many as three valves in a single apparatus. Their design also makes operations cumbersome and brings about maintenance problems, since needle valves normally defy easy servicing access.

Thus, there has been demand for an effective vent system which is simple in construction and effective in venting a vacuum chamber without causing negative effects on wafers in the chamber. It is these drawbacks of the prior art that gave rise to the present invention.

SUMMARY OF THE INVENTION

A primary object of the present invention is to provide a slow vent valve for a vacuum chamber in semiconductor wafer manufacturing equipment, which is capable of restoring normal pressure in the evacuated chamber by a slight valve opening to permit a gentle flow of gas enough to keep the wafer producing environment undisturbed by particulate or ambient stirring caused by entering gas before the valve is fully opened.

Another object of the invention is to provide such a valve which is simple in construction and easily can provide readily maintenance access.

A still another object is to provide such a valve which permits easier maintenance access than in conventional valves.

A further object is to provide such a valve which enables one to set the valve open timing for adjusting initial diaphragm pressing force on the valve seat.

DETAILED DESCRIPTION OF THE PREFERRED EMBODIMENTS

Figure 1:
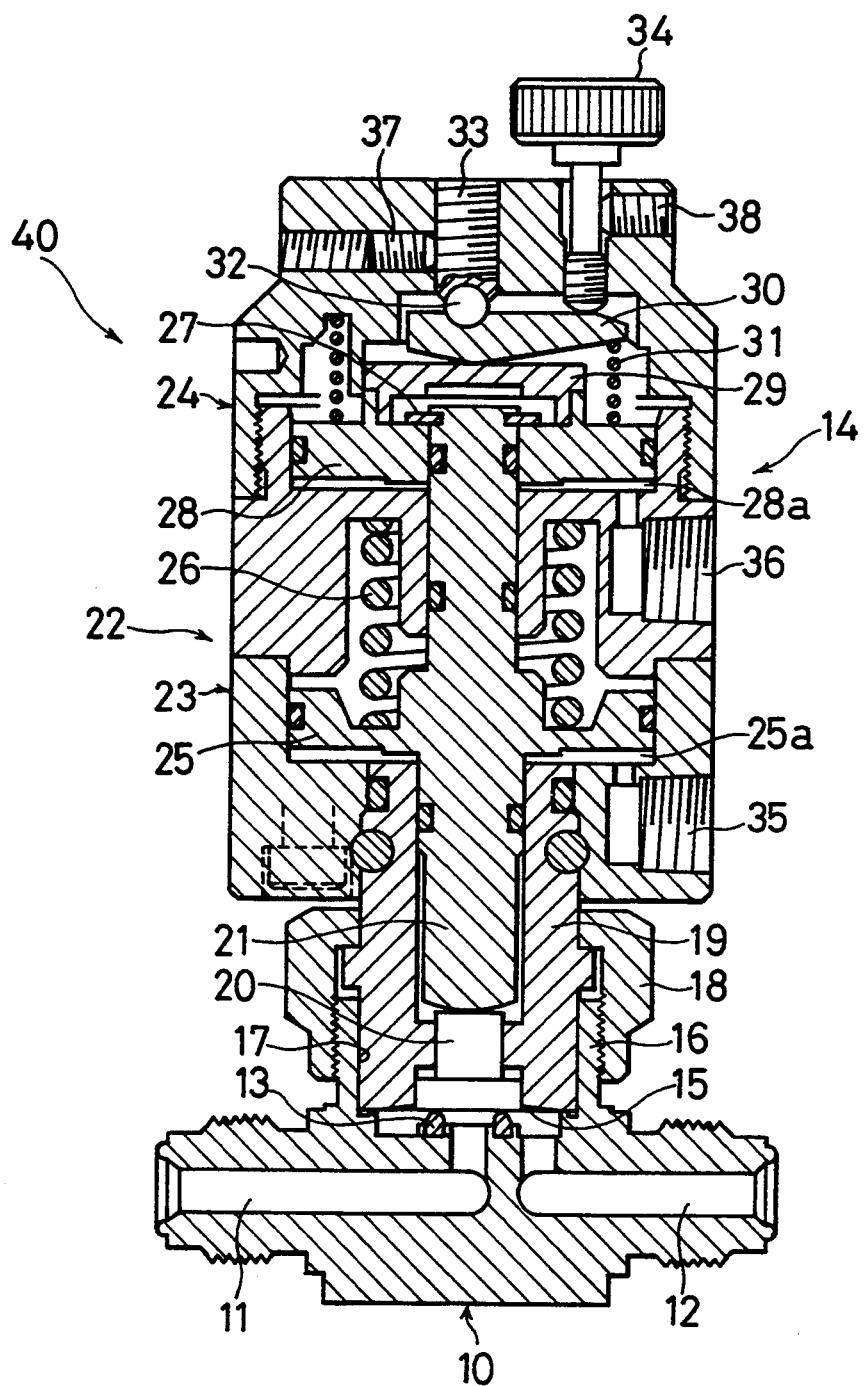
FIG. 1 is a schematic cross-sectional view of a preferred embodiment of the slow vent valve built according to the present invention.

Referring to FIG. 1, a slow vent valve 40 according to a preferred embodiment of the present invention comprises a valve casing 10 provided at a bottom portion thereof with an inlet passage 11 and an outlet passage 12. Also, the valve casing 10 has a valve seat 13 centrally mounted in the valve 40, into which the inlet passage 11 opens.

A metal diaphragm 15 made of a resilient material is provided above the valve seat 13, which flexes into or out of contact with the valve seat 13, to shift between a valve open position and a fully closed position by establishing or breaking the fluid-flow communication from the inlet passage 11 to the outlet passage 12.

The valve seat 13 is situated at the point where the inlet passage 11 meets the diaphragm 15, and allows gas from the inlet passage to flow into the outlet passage 12 when the diaphragm 15 is in an open position, a position where the diaphragm bulges away in the center from the valve seat.

When the diaphragm 15 is in its fully closed position lying flat closely over the valve seat 13, the fluid-flow connection is disconnected between the inlet passage 11 and outlet passage 12. A main feature of the present invention is that the diaphragm 15 is made to lift from the valve seat 13 in two controlled steps, first by a slight valve opening to allow a minimal slow flow of gas to the outlet passage 12 and then widely to effect a full open flow from the inlet passage 11, as will later be discussed in detail.

The diaphragm 15 may preferably be formed to an inverted bowl shape so that, only when pressure is exerted from above, the diaphragm flattens itself to overlie the valve seat 13 disconnecting the fluid-flow relationship between the inlet passage 11 and outlet passage 12. When the pressure is removed, the diaphragm 15 returns back to its initial upwardly bulged position on its own elasticity, resuming the fluid-flow relation between the passages.

The movement of the metal diaphragm 15 in operative relation to the valve seat 13, is controlled by a valve drive mechanism 14, which is situated on top of the diaphragm 15. The drive mechanism comprises a round hollow bonnet 19 which is mounted in fixed position above the valve seat 13, housed in an externally threaded annular sleeve 16 that extends upward from and made integral with the valve casing 10.

The bonnet 19 is provided to anchor the diaphragm 15 in position whose periphery is firmly clamped by an annular bottom part of the bonnet. An internally threaded nut 18 embraces the bonnet 19 over the sleeve 16, thereby integrating the valve casing 10 with the rest of the slow vent valve 40 into a rigid assembly.

The valve drive system 14 also includes a diaphragm pusher 20 that is slidably disposed in the bonnet. The diaphragm pusher 20 may preferably be shaped to have a lower end portion of enlarged diameter. When the pusher 20 is driven downward, its enlarged lower portion pushes the diaphragm 15 into contact with the valve seat 13.

The vertical movement of the pusher 20 is effected by a reciprocating valve rod 21 that is also slidably disposed for vertical movement in the hollow bonnet 19. The valve rod 21 is in turn moved in vertical direction by an actuator 22, which is a principal part of the drive mechanism 14.

The actuator 22 comprises a pair of two major components to perform separate operations; a first drive section 23 provided to do the full lift operation of the diaphragm and a second drive section 24 designed to set controlled operation parameters for slow flow nitrogen gas supply through the outlet passage 12.

The first drive section 23 embraces an upper portion of the hollow bonnet 19, and is drivingly connected to the valve rod 21. The second drive section 24, which is mounted on top of the first drive section 23, is drivingly interlocked with the first section to control the open speed and the open timing of the diaphragm 15 as it bulges away from the valve seat 13.

The first drive section 23 includes a largely bowl-shaped first piston 25 that is integrated with a middle portion of the valve rod 21 and reciprocally disposed in the first drive section 23 for united movement with the valve rod 21. A compression spring 26 is installed around the valve rod 21, seated on top the first piston 25. The spring 26 is provided to exert downward pressure on the piston to urge the diaphragm 15 into contact with the valve seat 13 through the valve rod 21, when the valve 40 is in its closed position.

Also provided at a mid point of the first drive section 23 is an air inlet port 35 which supplies compressed air through a gas pipe, not shown, into a first chamber 25a that is defined below the annular piston 25 in the drive section. When the air inlet port 35 is opened, compressed air is admitted to the first chamber 25a to hydraulically push upward the first piston 25 against the force of the spring 26, to thereby uplift the valve rod 21 and hence the diaphragm pusher 20, allowing the diaphragm 15 to disengage itself from the valve seat 13 on its resilient force.

The second drive section 24 comprises a disk-shaped second piston 28 that is reciprocally disposed in an upper portion of the valve rod 21, a compression spring 31 that is seated above the second piston 28 and a cam mechanism consisting of a cam 30 and a largely inverted-cup shaped cam follower 29 that is integrated with the second piston 28. The compression spring 31 is provided to exert downward force on the second piston 28 to thereby urge it in the direction to move the valve rod 21.

The second piston 28 has a hole in the center in which the valve rod 21 is inserted through a top portion thereof. An end ring 27 is affixed around an upper end portion of the valve rod 21 above the second piston 28. The ring 27 is provided to engage with the second piston 28 to help convert the upward and downward movement of the piston to the valve rod 21, causing the latter to ascend in the bonnet 19. This releases the downward force on the diaphragm 15, allowing it move away from the valve seat 13.

Furthermore, a second air inlet port 36 is provided, at a location adjacent to the second piston 28 in this particular embodiment, which supplies compressed air through an air pipe, not shown, into a second chamber 28a that is defined below the piston 28 in the second drive section 24. The air inlet 36 is opened to feed air into the chamber 28a to thereby hydraulically elevate the piston 28 against the force of the spring 31 through the end ring 27, hence the valve rod 21. As a result, the diaphragm 15 is allowed to a little bulge away from the valve seat 13 to performs an initial limited slow flow of nitrogen through the outlet passage 12.

The cam 30 has its bottom side formed to have a largely V-shaped cross section, with the apex of its triangular bottom constantly pressed into contact with the flat top surface of the cam follower 29. Furthermore, the cam 30 is movably disposed for pivoting about a fulcrum ball 32 that is mounted in an upper end portion of the second drive section 24. Also, the cam 30 is supported at one lateral end thereof (at the rightside in the drawing for this particular embodiment) on the spring 31.

With this arrangement, the cam 30 is balanced on the cam follower 29 and pivots about the ball 32 to position itself at an adjustable angle of tilt, for the purpose that will later be described in detail. The compression spring 31 is provided to exert downward force on the piston 28 to thereby hold the latter to stay close to the first drive section 23, disengaging the valve rod 21 from the second piston 28, when the air intake port 36 is closed.

A valve open timing adjuster 33 is mounted above the second drive section 24 and provided to adjust the level of the second piston 28 through the cam 30. To this aim, the valve open timing adjuster 33 may preferably be a bolt means having its tip constantly pressed against the fulcrum ball 32 in such a manner that turning the adjuster in either direction changes the level of the cam 30 through the ball to thereby move the second piston 28 to a lower or higher level in the second drive section 24.

For example, turning the valve open timing adjuster 33 clockwise causes the cam 30 and hence the cam follower 29 to come down against the force of the spring 31, to thereby push the second piston 28 through the end ring 27, hence the valve rod 21 down to a lower level in the bonnet 19, forcing the diaphragm 15 into contact with the valve seat 13. Likewise, the valve open timing adjuster 33 is turned counterclockwise to retract the second piston 28 to its original raised position.

In addition, a slow venting adjuster 34 is mounted also in an upper end portion of the second drive section 24 to adjust the angular position of the cam 30. To this aim, the slow venting adjuster 34 may preferably be a knob-topped bolt whose tip is constantly pressed against the cam 30 at or close to the end at which the cam is balanced on the spring 31. It is so designed that turning clockwise of the slow venting adjuster 34 causes the cam 30 to rock clockwise about the ball 32 against the force of the spring 31, to a tilted position.

The tension thus developed in the spring 31 adds more force on the second piston 28 when the piston is being slightly lifted by the pressure of compressed air entering the second chamber 28a, hence the valve rod 21, to release the downward pressure on the diaphragm 15.

Figure 2:
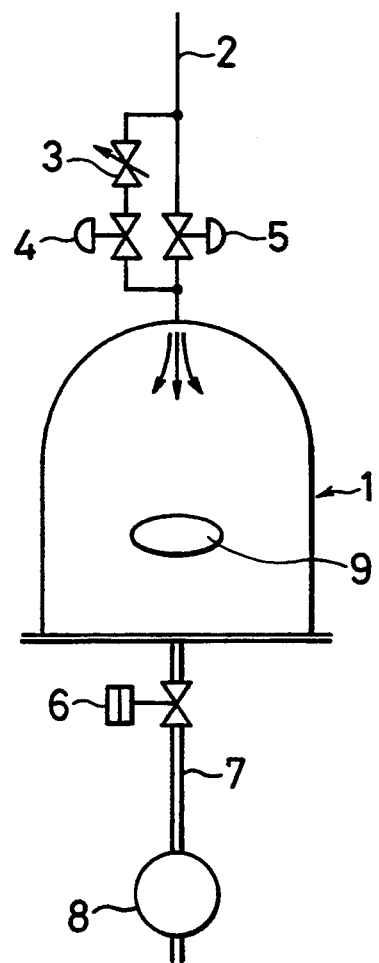
FIG. 2 is a schematic partial view of a conventional piping system for vacuum chambers in semiconductor wafer manufacturing equipment.

Referring to FIGS. 1 and 2, the operation of the slow vent valve 40 according to the present invention will be described. As shown in FIG. 2, the valve 40 is installed for connection to the vacuum chamber 1 to replace all the valves 3, 4 and 5 in the inlet piping 2.

When nitrogen gas is permitted to recover atmospheric pressure in the evacuated chamber 1, compressed air is supplied through the air inlet port 36 to the second chamber 28a, causing the second piston 28 to move up in the second drive section 24, overcoming the force of the spring 31. The upward movement of the piston 28 makes the valve rod 21 to inch up in the bonnet 19 through the end ring 27, releasing the pressure on the diaphragm 15 to thereby enable it to resiliently bulge upward from the valve seat 13.

A flow control valve means, not shown, is provided in the second air inlet port 36 to regulate the influx of compressed air to the second chamber 28a through to hydraulically lift the second piston 28, hence the valve rod 21 through the end ring 27 to allow the diaphragm 15 lift from the valve seat 13 on its own elasticity.

It is so designed in this particular embodiment that, when the valve rod 21 is raised 0.5 millimeter higher from its original position by filling the second chamber 28a with a measured volume of compressing air, the diaphragm 15 slightly lifts a distance of 0.1 millimeter on its own elasticity from the valve seat 13, to bring about a controlled slow flow of nitrogen gas to the evacuated vacuum chamber 1 through the outlet passage 12. With the valve 40 in this slow vent position, the nitrogen gas flow through the outlet passage 12 is kept until the evacuated chamber 1 is raised in pressure to 200-400 torrs.

When the vacuum chamber pressure reaches this range, it is designed so that compressed air is supplied through the air inlet port 35 immediately into the first chamber 25a to lift the first piston 25 in the bonnet 19 against the force of the spring 26. This pulls the valve rod upward, allowing the metal diaphragm 15 to move further away from the valve seat 13 to its fully lift position, which brings about a full gas flow rate through the piping 2 to the vacuum chamber 1 until the latter is returned to atmospheric pressure.

It may preferably be designed in this particular embodiment that change in the stroke of the second piston 28 in a range from 0 to 0.7 millimeter through adjustment of the slow venting adjuster 34 changes the lift of the diaphragm 15 in a 0-0.2 millimeter range for slow venting to the vacuum chamber 1.

A fixing screw 38 is mounted to extend perpendicular with the axis of the slow venting adjuster 34. The screw 38 is normally turned in to bring its tip abutted against the stem of the adjuster 34 to prevent it from accidental loosening. Each time the slow venting adjuster 34 has to be used to change venting flow rate, the screw 38 has to be loosened.

In addition, the open speed and the open timing of the fluid-flow for the diaphragm 15 is controlled by the valve open timing adjuster 33. It is designed that rotating the adjuster 33 clockwise adjusts the stroke of the second piston 28 by lowering the cam 30, hence the piston to a lower level in the second drive section 24 through the ball 32. This causes the valve diaphragm 15 pressing force to be adjusted when the diaphragm 15 is initially pressed on the valve seat 13.

Another fixing screw 37 is mounted adjacent to the valve open timing adjuster 33. The screw 37 is normally tightened to have its tip tightly pressed against the stem of the adjuster 33 to prevent it from accidental turning. When the valve open timing adjuster 33 is loosened for valve open timing adjusting, the screw 37 has first to be loosened.

When the slow vent valve 40 is in closed position, the filled air within the first and second drive section 23, 24 are discharged, then the first and second piston 25, 28 are downward moved by compression spring 26, 31, respectably.

These downward movements of the first and second piston 25, 28 allow the metal diaphragm 15 contact on the valve seat 13 through the downward movement of the valve rod 21 and pusher 21, then, disconnecting the fluid-flow relationship between the inlet passage 11 and outlet passage 12.

It will be easily seen that the slow vent valve 40 according to the present invention, when it is geared up for restoring atmospheric pressure in an evacuated chamber, can replace all the upstream valves in the nitrogen gas supply piping in conventional systems.

In addition, the valve 40 can improve vacuum chamber operations by providing two-stage control in the flow of nitrogen gas to the chamber. The valve 40 first opens slightly to allow only a minimum gas slow influx so as to protect the wafer processing environment from being disturbed by the turbulent flood of gas as in conventional systems. Following the initial stages of slow venting, the valve 40 switches to a normal supply of gas to recover atmospheric pressure in the chamber.

Moreover, the valve 40 can improve the purging operation for the remaining gas within the evacuated vacuum chamber 1 and connected upper system.

Furthermore, the adjusters 33 and 34 permit changes in the valve open timing and slow vent rate of the valve 40, adding to the above-mentioned features of the present invention.

What is claimed is:

1. A slow vent valve for controlling gas flow to a vacuum chamber in semiconductor wafer manufacturing equipment, comprising a valve casing, a valve seat mounted in the valve casing, a diaphragm made of a resilient metal mounted above the valve seat and provided to flex on its own resilience into fluid-tight contact or away from the valve seat to control the fluid-flow relationship between an inlet passage and an outlet passage that are mounted in the valve casing, the outlet passage being adapted for connection to an external vacuum chamber, a valve rod vertically slidably disposed in a stationary bonnet that is mounted above the valve casing and made to clamp the diaphragm along a periphery thereof around the valve seat, the valve rod being reciprocated to drive the diaphragm, while being held in contact therewith, between fully closed and open positions, a first piston which is reciprocally disposed and made integral with the valve rod for united movement therewith in the bonnet, a first compression spring adapted to exert downward force on the first piston, a first inlet port provided to supply a regulated amount of compressed air to a first fluid tight chamber to thereby push up the first piston against the force of the first spring to allow the diaphragm to flex away from the valve seat to its fully-open position to vent the vacuum chamber, a second piston reciprocally disposed above the first piston having a throughhole centrally bored therein into which the valve rod extends, an end ring integral with the valve rod whereby the upward movement of the second piston, valve rod upwardly, a second compression spring mounted on top of the second piston and provided to exert downward pressure on the second piston to move downwardly the valve rod, a cam follower mounted on top of the second piston with which the cam follower is integrated for unified vertical movement, a cam having a V-shaped bottom and movably disposed above the second piston for pivoting about a fulcrum ball, the cam being balanced to have the apex of the V-shaped bottom pressed into contact with the top surface of the cam follower, the cam being supported at a lateral end by the second spring which urges the cam to be moved to a tilted position, a second inlet port provided to supply a regulated amount of compressed air to a second chamber defined beneath the second piston to push the second piston upward against the force of the second piston and hence the valve rod to allow the diaphragm to flex to a slightly open position, a valve open timing adjuster operatively connected to the cam in such a manner as to adjust the initial diaphragm pressing force on the valve seat to thereby determine the time that the valve is open, and a slow venting adjuster engaging the cam at an end where the cam is supported on the second spring and adapted in such a manner as to enable the cam to adjust the force of the second spring to resist the second piston being pushed upward by the pressure of the air entering the second chamber, to thereby adjust the venting flow rate of venting for the vacuum chamber.

* * * * *